US011559798B2

(12) United States Patent
Schrage et al.

(10) Patent No.: US 11,559,798 B2
(45) Date of Patent: Jan. 24, 2023

(54) PROCESS FOR PRODUCTION OF ATTRITION STABLE GRANULATED MATERIAL

(71) Applicant: Sasol Germany GmbH, Hamburg (DE)

(72) Inventors: Christian Schrage, Hamburg (DE); Marco Friedrich, Eddelak Schleswig-Holstein (DE)

( * ) Notice: Subject to any disclaimer, the term of this patent is extended or adjusted under 35 U.S.C. 154(b) by 0 days.

(21) Appl. No.: 16/488,728

(22) PCT Filed: Apr. 4, 2018

(86) PCT No.: PCT/EP2018/058656
§ 371 (c)(1),
(2) Date: Aug. 26, 2019

(87) PCT Pub. No.: WO2018/185194
PCT Pub. Date: Oct. 11, 2018

(65) Prior Publication Data
US 2021/0046468 A1  Feb. 18, 2021

(30) Foreign Application Priority Data
Apr. 6, 2017  (EP) .................................. 17165384

(51) Int. Cl.
*B01J 37/00*  (2006.01)
*B01J 2/16*  (2006.01)
(Continued)

(52) U.S. Cl.
CPC ............. *B01J 37/0063* (2013.01); *B01J 2/16* (2013.01); *B01J 21/04* (2013.01); *B01J 35/0026* (2013.01);
(Continued)

(58) Field of Classification Search
CPC . B01J 2/16; B01J 21/04; B01J 35/0026; B01J 35/023; B01J 35/08; B01J 35/1009;
(Continued)

(56) References Cited

U.S. PATENT DOCUMENTS 5,145,826 A  9/1992  Hirschberg et al.
5,254,516 A  10/1993  Gupta et al.
(Continued)

FOREIGN PATENT DOCUMENTS

JP  57038938  3/1982
JP  2000503294  3/2000
(Continued)

OTHER PUBLICATIONS

Carberry, J.J., 2001, Chemical and Catalytic Reaction Engineering, Dover, 672 pp. [Office action cites p. 376].*
(Continued)

*Primary Examiner* — Brian A McCaig
(74) *Attorney, Agent, or Firm* — Bushman Werner, P.C.

(57) ABSTRACT

The present invention relates to granulated particles with improved attrition and a method for producing granulated particles by fluidized bed granulation of inorganic particles wherein particles of reduced particle size are fed into a fluidized-bed granulation reactor thereby producing granulated particles with improved attrition.

18 Claims, 8 Drawing Sheets

Figure 2:
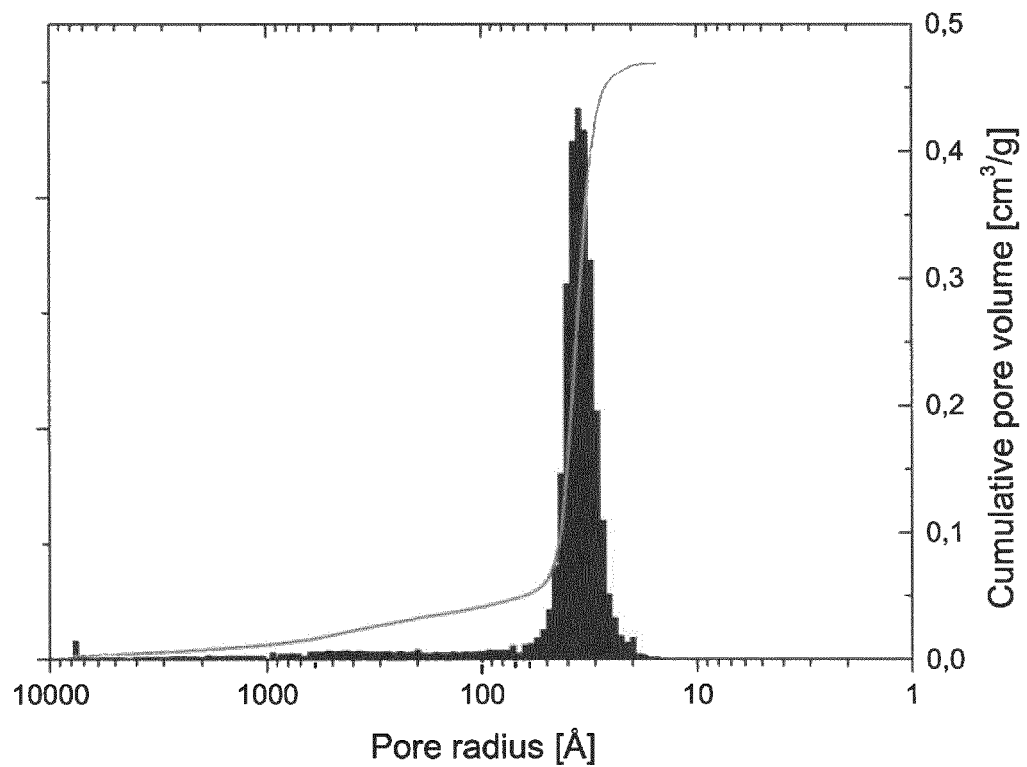

(51) Int. Cl.
*B01J 21/04* (2006.01)
*B01J 35/00* (2006.01)
*B01J 35/02* (2006.01)
*B01J 35/08* (2006.01)
*B01J 35/10* (2006.01)
*B01J 37/10* (2006.01)

(52) U.S. Cl.
CPC ............. *B01J 35/023* (2013.01); *B01J 35/08* (2013.01); *B01J 35/1009* (2013.01); *B01J 35/109* (2013.01); *B01J 35/1014* (2013.01); *B01J 35/1019* (2013.01); *B01J 35/1038* (2013.01); *B01J 35/1042* (2013.01); *B01J 35/1047* (2013.01); *B01J 35/1085* (2013.01); *B01J 35/1095* (2013.01); *B01J 37/0018* (2013.01); *B01J 37/0036* (2013.01); *B01J 37/0045* (2013.01); *B01J 37/10* (2013.01)

(58) Field of Classification Search
CPC ................ B01J 35/1014; B01J 35/1019; B01J 35/1038; B01J 35/1042; B01J 35/1047; B01J 35/1085; B01J 35/109; B01J 35/1095; B01J 37/0018; B01J 37/0036; B01J 37/0045; B01J 37/0063; B01J 37/10
See application file for complete search history.

(56) References Cited

U.S. PATENT DOCUMENTS

| | | | |
|---|---|---|---|
| 5,427,995 A | 6/1995 | Ziebarth et al. | |
| 6,106,803 A * | 8/2000 | Hasenzahl | B01J 37/0045 |
| | | | 423/705 |
| 2002/0160192 A1 | 10/2002 | Salem et al. | |
| 2005/0171364 A1* | 8/2005 | Onimus | C07D 301/06 |
| | | | 549/531 |
| 2013/0143736 A1* | 6/2013 | Koranne | B01J 37/0201 |
| | | | 502/439 |
| 2014/0302977 A1* | 10/2014 | Kunisa | C03B 1/00 |
| | | | 264/117 |
| 2016/0074844 A1* | 3/2016 | Freer | B01J 37/0009 |
| | | | 585/658 |

FOREIGN PATENT DOCUMENTS

| | | |
|---|---|---|
| WO | 2011093488 | 4/2011 |
| WO | 2013089222 | 6/2013 |

OTHER PUBLICATIONS

Bukur, D.B. et al., 2004, Industrial and Engineering Chemistry Research, 43, 1359-1365.*

* cited by examiner

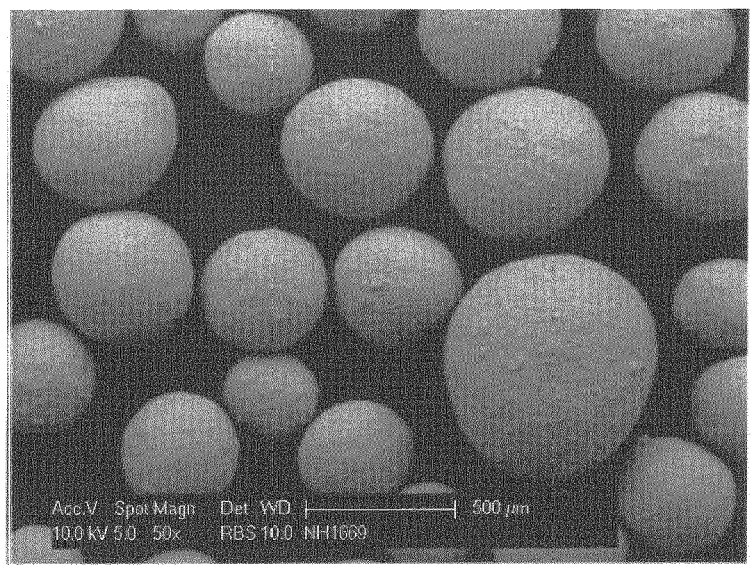
Fig. 1.1
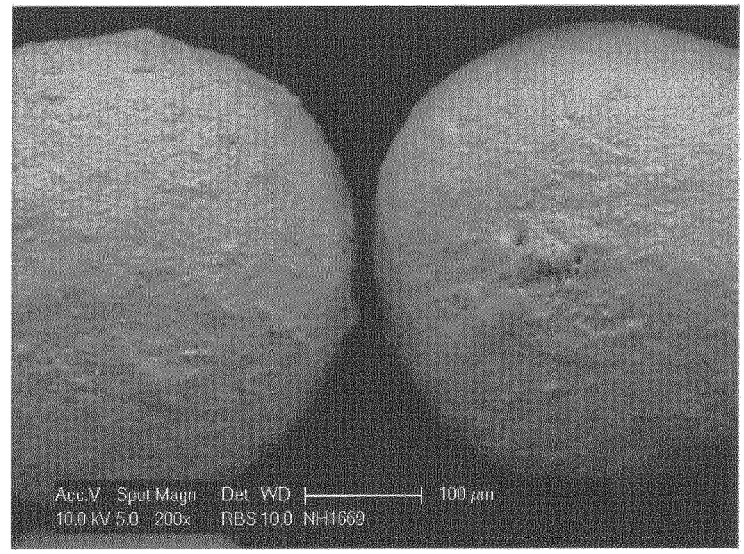
Fig. 1.2
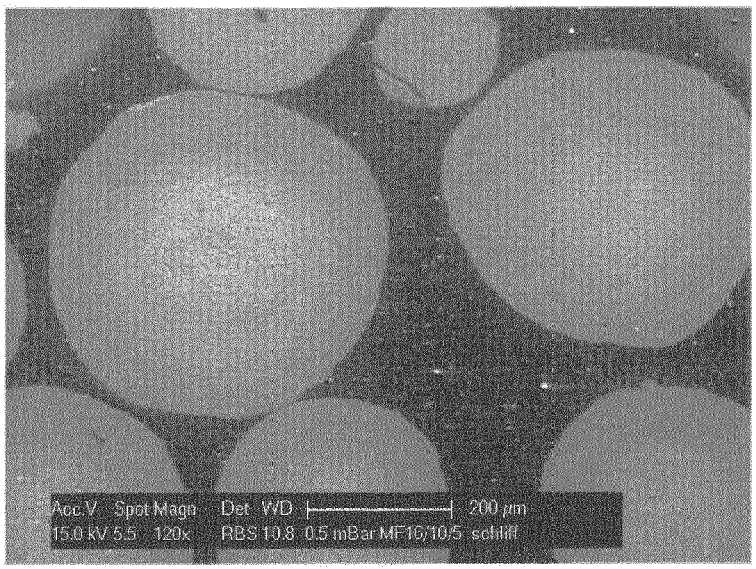
Fig. 1.3

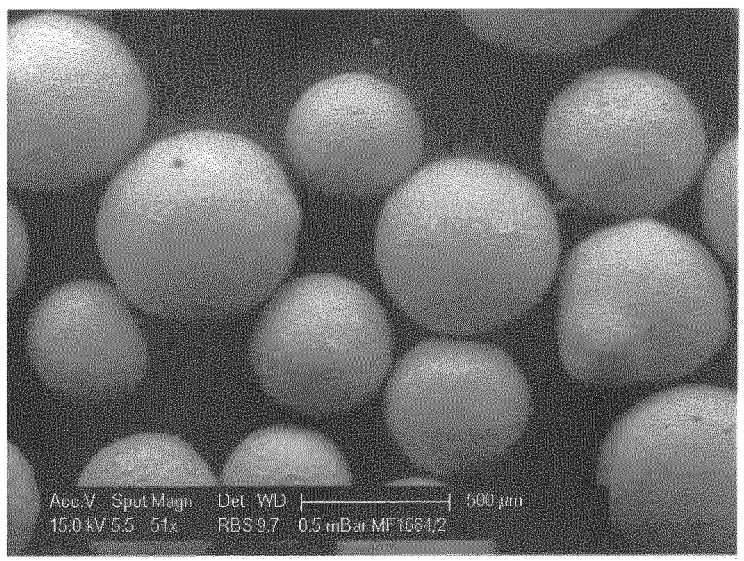
Fig. 3.1
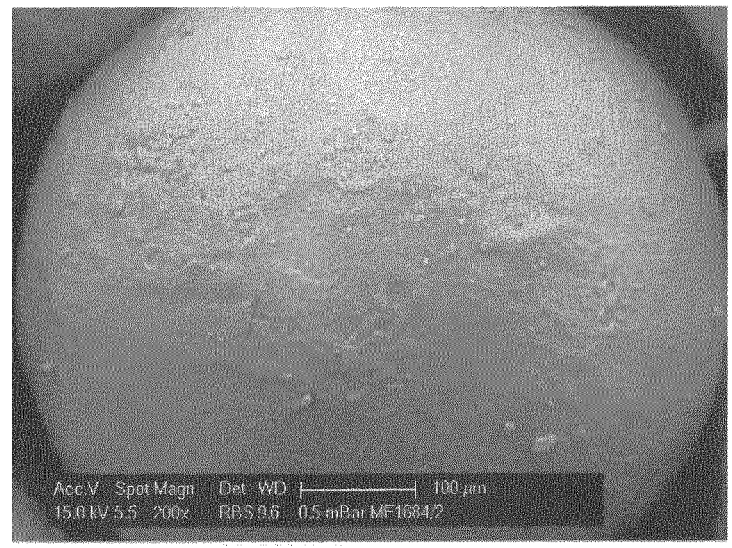
Fig. 3.2
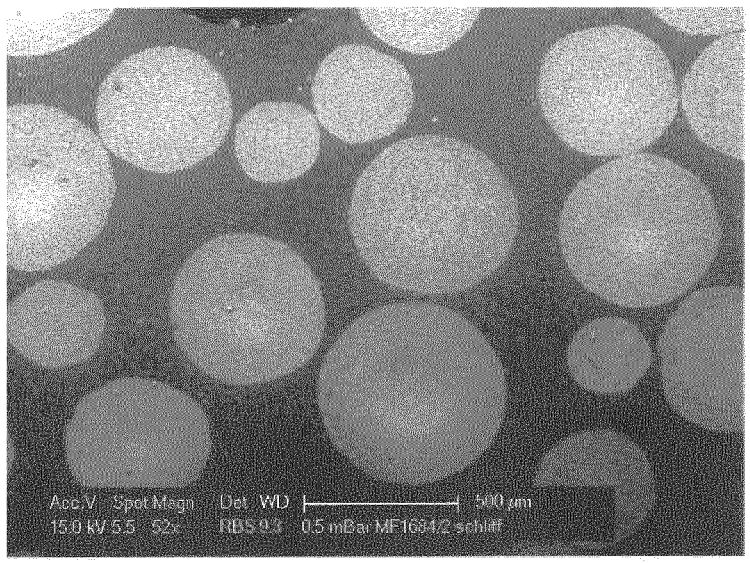
Fig. 3.3

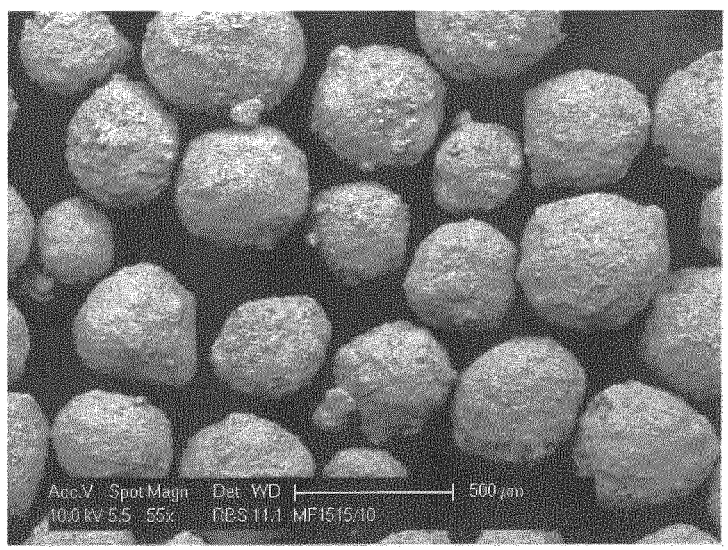
Fig. 5.1
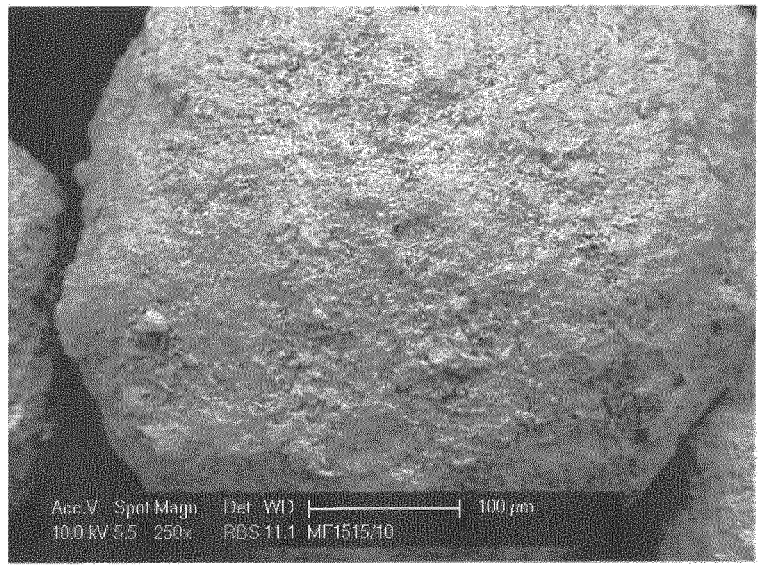
Fig. 5.2
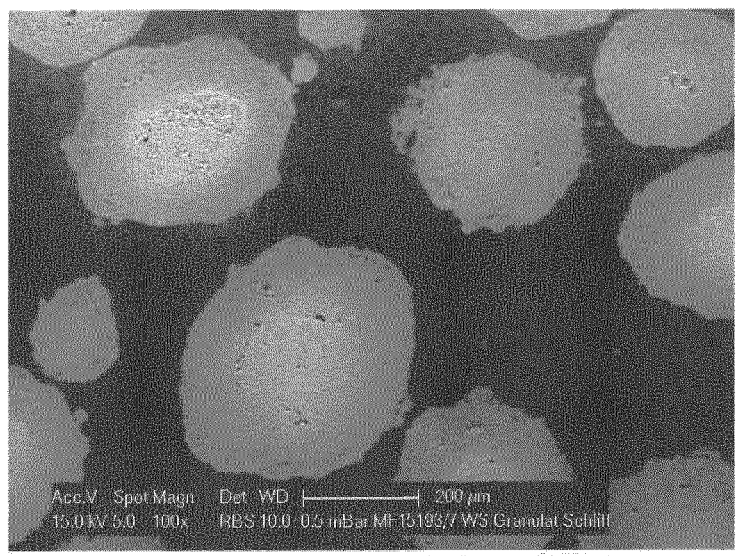
Fig. 5.3

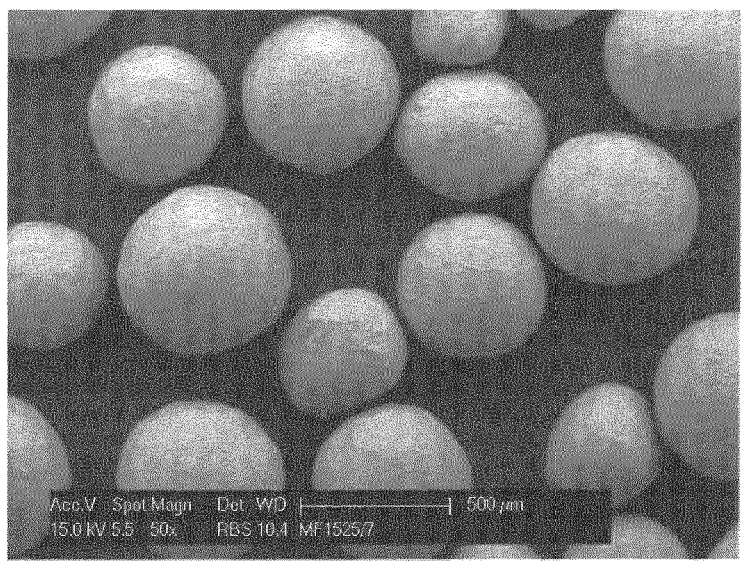
Fig.7.1
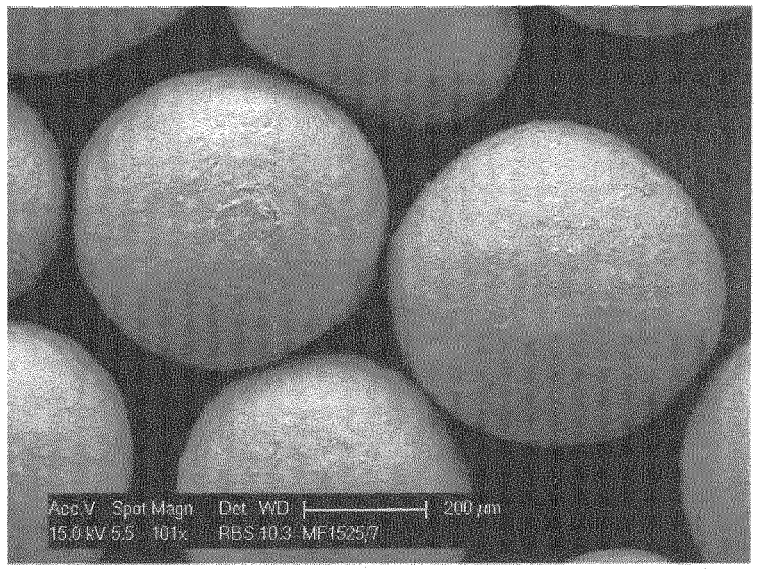
Fig. 7.2
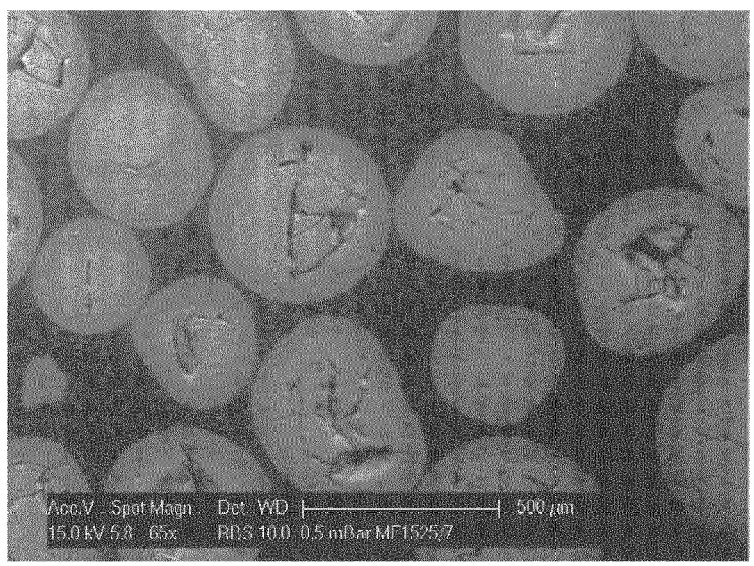
Fig. 7.3

PROCESS FOR PRODUCTION OF ATTRITION STABLE GRANULATED MATERIAL

The present invention relates to a method of producing granulated particles in a fluidized-bed granulation reactor and to spherical, granulated particles.

BACKGROUND AND PRIOR ART

Certain chemical processes utilize chemical reactors where catalysts are kept in motion. Examples of such reactors include moving-bed reactors which are well known in the field of hydroprocessing, fluidized-bed reactors used for various heterogenic catalytic gas phase reactions and slurry phase reactors used for the Fischer-Tropsch process. Most of the catalysts used in these processes are supported catalysts. These supported catalysts include carrier materials comprising solid inorganic oxides or mixed oxides like alumina, silica, silica-alumina, zeolites, titania or mixtures thereof. There are a number of processes for the preparation of these carriers including spray-drying, agglomeration, extrusion, spheronization, granulation or sol-gel dropping techniques, and compaction. The processes described produce catalyst carriers having particles with typical particle diameters in the range between 50 μm and 5000 μm.

Fluidized bed granulation is a very versatile method for preparing carrier materials having a median particle size between 100 μm and 1000 μm. This method has been described in various prior art documents including EP 0163836 B1 and EP 0611593 B1, which teach processes for the continuous production of granules using fluid-bed granulation. DE 19629690 A1 teaches that alpha-alumina particles are agglomerated using an organic binder for use as abrasives. DD 274980 teaches a process for the production of spherical granulates based on alumina that may be used as adsorbents, catalysts components or catalysts. DE 274980 describes that the granulation dispersion is prepared by stirring a boehmite rich compound in a dilute nitric acid with a $HNO_3/Al_2O_3$ ratio of 0.08.

Due to the motion of the catalyst particles in such reactors, attrition stability is an important characteristic of these catalyst particles as it directly influences the economics of these processes.

The granulated particles obtained by the prior art methods are characterized by a rather rough surface which affects the attrition stability in a negative way. It is therefore an object of the invention to improve this specific characteristic.

SUMMARY OF THE INVENTION

Surprisingly, it has been found that the attrition of the spherical granulated particles obtained from a fluidized-bed granulation process can be substantially improved by decreasing the particle size of the inorganic particles fed into a fluidized-bed granulation reactor.

According to a first aspect of the invention, there is provided a method of producing granulated particles in a fluidized-bed granulation reactor, the method comprising feeding inorganic particles dispersed in a dispersion medium into the fluidized-bed granulation reactor, the inorganic particles in the dispersion medium having a $D_{90}$ value (D=Diameter) of between 1 μm and 15 μm.

The particle size $D_{90}$ value of the inorganic particles fed into the fluidized-bed granulation reactor is preferably between 1 μm and 10 μm, most preferably between 1 μm and 5 μm. By $D_{90}$ value is meant that 90% of all inorganic particles in the dispersion medium are smaller than this size and 10% are larger than this size. The particle size $D_{90}$ value of particles in the dispersion is determined by laser scattering with a Malvern Mastersizer 2000.

The inorganic particles may include compounds of alkaline earth metals, rare earth elements, platinum group elements, iron group elements, Cu, Ag, Au, Zn, Al, In, Sn, Si, P, V, Nb, Mo, W, Mn, Re, Ti, Zr or mixtures thereof. Preferably, the inorganic particles include compounds of Al, Si, Ti, Mg, Zn, Ca, or mixtures thereof. Most preferably, the inorganic particles include the particles of alumina, silica or a mixture thereof. Preferably, the compounds are oxides or oxide hydrates or mixed oxides or mixed oxide hydrates.

Typically, the alumina particles are of high purity and contain less than 100 ppm Na, less than 150 ppm Fe and less than 200 ppm Si.

The alumina may include hydrated alumina such as Boehmite, Bayerite, transition aluminas such as γ- (gamma), δ- (delta), or θ- (theta) alumina, α- (alpha) alumina or mixtures thereof. Preferably, the alumina consists of or includes Boehmite. For the purpose of this invention the term Boehmite also includes Pseudo-Boehmite.

If the inorganic particles comprise Boehmite the crystallite size of the Boehmite calculated from the (120) reflection using the Scherrer formula may be in the range between 3 nm and 50 nm.

The inorganic particles are dispersed in a dispersion medium before being fed into the fluidized-bed granulation reactor.

The dispersion medium is a liquid and usually is water but may also include organic polar solvents, monoprotic acids, a stabilizer, a base, or mixtures thereof.

The organic polar solvents may include alcohols, ethers, esters, ketones, amides, nitriles, sulfoxides for example ethanol, isopropanol, tetrahydofuran, ethyl acetate, acetone, dimethylformamide, acetonitrile, dimethyl sulfoxide, or mixtures thereof.

If a monoprotic acid is added to the dispersion medium then, less than 5 vol-% (with respect to the undiluted acid and relative to the total volume of the dispersion medium) of a monoprotic acid may be added. The monoprotic acid may include nitric acid, formic acid, acetic acid, or mixtures thereof.

Optionally, a stabilizer is added to the dispersion acting as a dispersion aid or a binder. This stabilizer may include phosphates, phosphonates, silicates, huminates, polycarboxylic acids, polycarboxylic acid salts, sulphonates, glycols, polyvinyl acetates, polyvinyl alcohols, carbohydrates, gum arabicum, sugars or mixtures thereof. Preferably the stabilizer is a polyvinyl alcohol or a carbohydrate, in particular chemically modified cellulose such as hydroxymethyl cellulose.

The amount of stabilizer added to the dispersion medium depends on the inorganic particles selected. Usually an amount of between 0.2 to 10 wt.-% of stabilizer relative to the amount of inorganic particles is added to the dispersion medium. If alumina is selected as the inorganic particle then preferably between 0.5 and 5% wt.-% of the stabilizer relative to the amount of alumina particles is added to the dispersion medium.

The base may include ammonia.

Further, if alumina is selected as the inorganic particles, then preferably, the dispersion medium is the same as the dispersion medium obtained by the hydrolysis of aluminium alcoholate prepared according to DE 3244972 C1 or EP 0790859 B1, incorporated herein by reference. Therein, an apparatus and a method for the reaction of metals (for example aluminum) with $C_1$ to $C_{12}$ alcohols in pure form or in mixtures thereof is disclosed. The resulting product is an aluminum alcoholate which can then be hydrolyzed in water, acidified water, or in a water-ammonia solution to form a dispersion of an aluminium oxide-hydroxide.

The pH of the dispersion medium is typically in the range of 2-12, preferably in the range of 4-10 and most preferably in the range of 5-8.

The inorganic particle solid content of the dispersion medium is in the range between 5% and 60% (inorganic particle per weight relative to the total weight of the dispersion medium (excluding any solid content)).

The method of the invention may include the initial step of milling the inorganic particles to a particle size $D_{90}$ value of between 1 μm and 15 μm, preferably between 1 μm and 10 μm and most preferably between 1 μm and 5 μm. Preferably, the inorganic particles are milled in the dispersion medium to a particle size $D_{90}$ value of between 1 μm and 15 μm, preferably between 1 μm and 10 μm and most preferably between 1 μm and 5 μm.

The method of the invention includes the subsequent step of calcination. Calcination is conducted at temperatures from 350 to 1600° C., preferably 550 to 1200° C., for a period of time, between 30 min and 5 hours. Calcination removes traces of organic binder, if used, and, also converts boehmite, if selected, into transition alumina or alpha alumina.

In the fluidized-bed granulation reactor a dispersion medium including inorganic particles is sprayed into a process chamber while heated process gas flows through the process chamber from the bottom to the top.

Primary particles (seed material) are required for the process and may be formed either by spray drying of the dispersion medium including the inorganic particles, or are optionally already present in the process chamber. These primary particles (seed material) have a $D_{50}$ ranging from 5 to 200 μm, preferably a $D_{50}$ ranging from 50 to 80 μm. By primary particles or seed material is meant powder material put into the process chamber at the very beginning of a process. By $D_{50}$ is meant the "median" meaning that 50% of all particles are smaller than this size and 50% are larger than this size.

Granules are formed by spraying the dispersion medium with the inorganic particles onto the seed particles in the process chamber. The dispersion medium then evaporates as heated process flow gas flows through the process chamber and the inorganic particles agglomerate on the seed particles. This process is repeated as required.

The fluidized-bed granulation reactor usually has a heated gas flow with a superficial velocity ranging from 0.5 to 5 m/s and fluidization numbers ranging from 2 to 12. By fluidization numbers is meant the quotient between the applied superficial velocity and the superficial velocity at the point of minimal fluidization as described in "Wirbelschicht-Sprühgranulation", Hans Uhlemann and Lothar Mörl, Springer Berlin Heidelberg, 2000, page 30 (ISBN 978-3-642-63125-2). The temperature of the gas at the time of introduction into the fluidized-bed granulation reactor (herein after "inlet temperature") is preferably between 20° C. and 550° C. and is in particular between 50° C. and 550° C. For alumina, the inlet temperature is typically between 100° C. and 400° C.

The dispersion medium with the inorganic particles is typically sprayed into the fluidized-bed granulation reactor with specific evaporation rates from 45 to 1000 kg/m² related to the area of the distribution plate or 0.08 to 7 kg/(kg*h) related to the bed mass using a spraying pressure of between 0.5 bar and 7 bar (gauche pressure).

During the process of the invention, the temperature inside the process chamber of the fluidized-bed granulation reactor is held between 40° C. and 100° C., preferably between 50° C. and 60° C., while also independent thereof the relative humidity inside the process chamber may be adjusted ranging from 20% to 60%, preferably from 35% to 45%.

Granules are discharged from the process chamber when the desired particle size is reached. This is conducted typically by a classifier or through a rotary valve and a successive screen. Dry particles below the targeted particle size are re-fed into the process chamber while dry particles above the targeted size can be milled and also re-fed into the process chamber to maintain a continuous production of the granules.

According to a second aspect of the invention there is provided granulated particles produced according to the method of the invention having a $D_{50}$ value of between 100 μm and 5000 μm, preferably between 400 μm and 1000 μm.

According to a third aspect of the invention there is provided spherical calcined granulated particles, the particles having a $D_{50}$ value of between 100 μm and 5000 μm, a volume based sphericity of between 0.900 and 1.00, and an attrition value of less than 5%, preferably less than 2%, the particles further being characterised by one, more than one, or all, preferably more than one, and most preferably all, of the following characteristics:

i) a loose bulk density between 0.3 and 2.5 g/cm³, preferably between 0.5 and 2.0 g/cm³, most preferably between 0.5 and 1 g/cm³;
ii) a specific surface area ranging from 0.1 to 500 m²/g, preferably 150 to 300 m²/g, most preferably 150 to 250 m²/g;
iii) a pore volume of 0.01 to 2.0 cm³/g, preferably between 0.1 and 1 cm³/g;
iv) a monomodal or multimodal pore size distribution with pore radii maxima between 25 Å and 100000 Å, preferably between 25 Å and 500 Å, most preferable between 25 Å and 100 Å.

The $D_{50}$ value of the calcined granulated particles is preferably between 150 μm and 2000 μm, more preferably between 200 μm and 800 μm, and most preferably between 400 μm and 1000 μm.

The calcined granulated particles are preferably obtainable by the method hereinbefore described.

Analytical Methods and Parameter Definition

Attrition value:

The attrition value is determined by following the principles set out in: "J.-F. Le Page, J. Cosyns, P. Courty, E. Freund, J.-P. Frank, Y. Jacquin, B. Juguin, C. Marcilly, G. Martino, J. Miguel, R. Montarnal, A. Sugier, H. Van Landeghem; Applied heterogeneous catalysis—Design, manufacture, use of solid catalysts, Éditions Technip, 1987, p 180-181, chapter 6.3.3.4 in that the method outlined below is carried out:

54 g of granulated particles are put into a cylindrical glass column with a diameter of 4 cm and a height of 40 cm. At the bottom of the column a nozzle plate with one nozzle and an orifice of 0.5 mm is mounted. The nozzle is placed in the middle of the nozzle plate. The sample is fluidized from the bottom with nitrogen with an inlet pressure of 1.5-2.5 bar (gauche pressure) flowing through the nozzle leading to a fluidized bed height of approximately 20 cm. For comparison of different granulated particles the parameters are chosen in a way such that a comparable fluidized bed height is achieved. During the fluidization fines are generated due to collision of granulated particles with the wall of other granulated particles. These fines are collected on a filter placed at the upper outlet of the column. After a time of 3 h the fines collected on the filter were weighed together with the filter (of known weight).

The attrition value is defined as the dry mass of the fines related to the dry mass of the initially used granulated particles in percent while the dry mass of each fraction is determined by thermogravimetry with a thermobalance measured at a temperature of 110° C. until weight constancy is obtained.

Sphericity:

As described in ISO 13322-2 (2006) the volume based sphericity is determined by dynamic image analysis with a Camsizer P4 from Retsch. The volume based sphericity is calculated from the measured perimeter P and area A of the particle projection using following equation.

$$SPHT3 = \frac{4\pi A}{P^2}$$

The determined value is dimensionless and would be 1 for an ideal sphere and is typically below 1 for spheroidal particles which are non-ideal spheres.

Particle size and Particle size distribution:

The $D_{90}$ value of the inorganic particles in the dispersion medium is measured by laser scattering with a Malvern Mastersizer 2000 in an aqueous dispersion applying Mie theory. D stands for diameter. The particles measured comprise substantially no agglomerated particles.

The $D_{90}$, $D_{10}$ and $D_{50}$ value of the granulated particles is measured with dynamic image analysis using a Camsizer P4 from Retsch. Only the primary particles are measured.

The $D_{50}$ value for the primary particles (seed material) is measured by laser scattering with a Malvern Mastersizer 2000 in an aqueous dispersion applying Mie theory.

Crystallite size:

The crystallite size based on the (120) reflection of the dispersed material is determined by X-ray diffraction of the solid material applying the well-known Scherrer equation.

Surface area and pore volume:

Surface area and pore volume are measured with $N_2$ physisorption using typical volumetric devices like the Quadrasorb from Quantachrome at temperature of liquid nitrogen. The surface area is determined using BET theory (DIN ISO 9277:2003-05), while the pore volume is determined according to DIN 66131. The pore size range is between 0 to 5000 nm in pore radius.

Loose bulk density:

Loose bulk density is measured (according to ISO 60) by determining the exact weight and the exact volume of the sample after pouring the sample into a 100 ml graduated cylinder.

Pore size and pore size distribution:

The pore size distribution is determined with mercury intrusion using a Porosimeter Autopore IV 9500 from Micromeritics according to DIN 66133.

Figure 4:
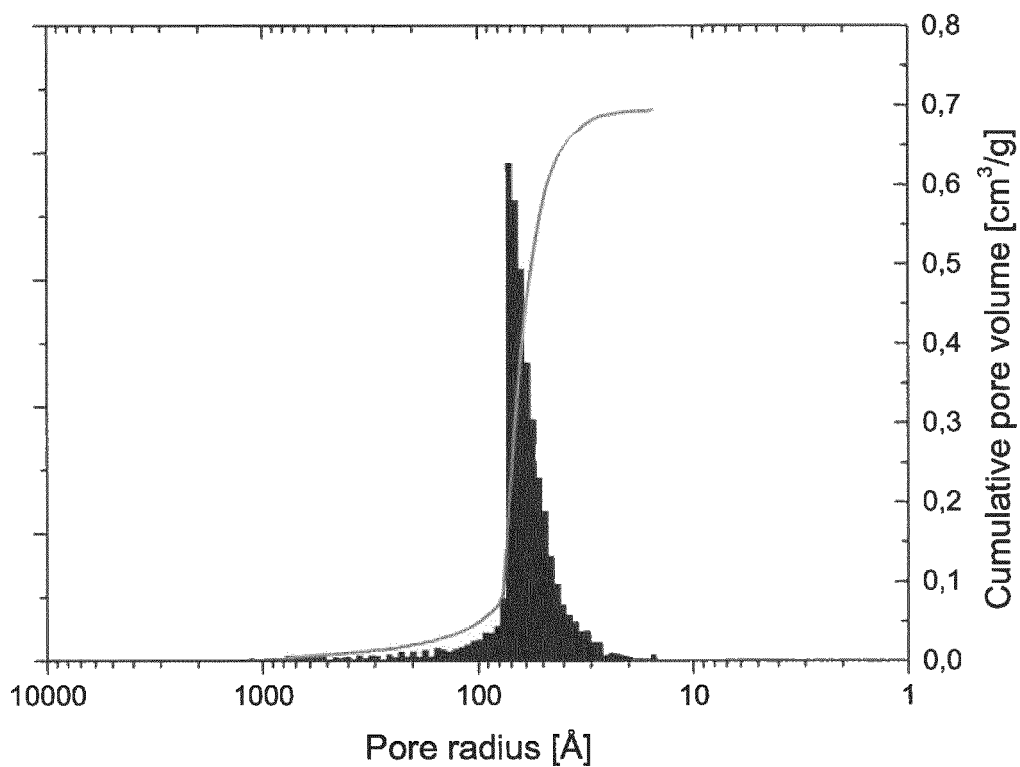
Figure 6:
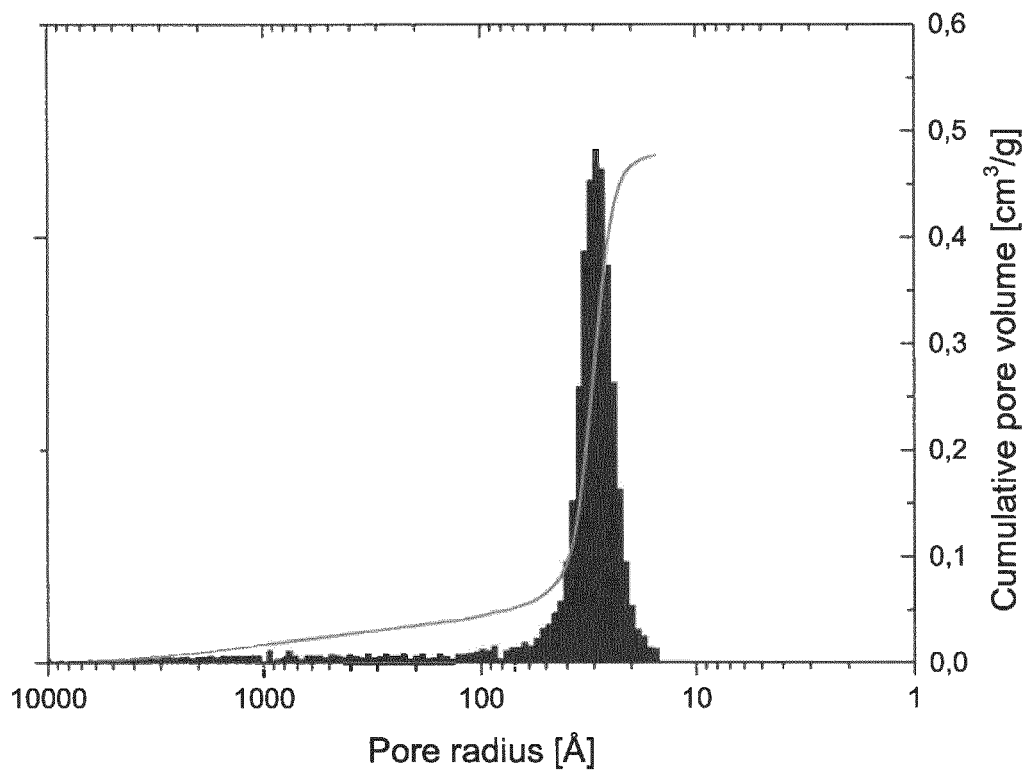
Figure 8:
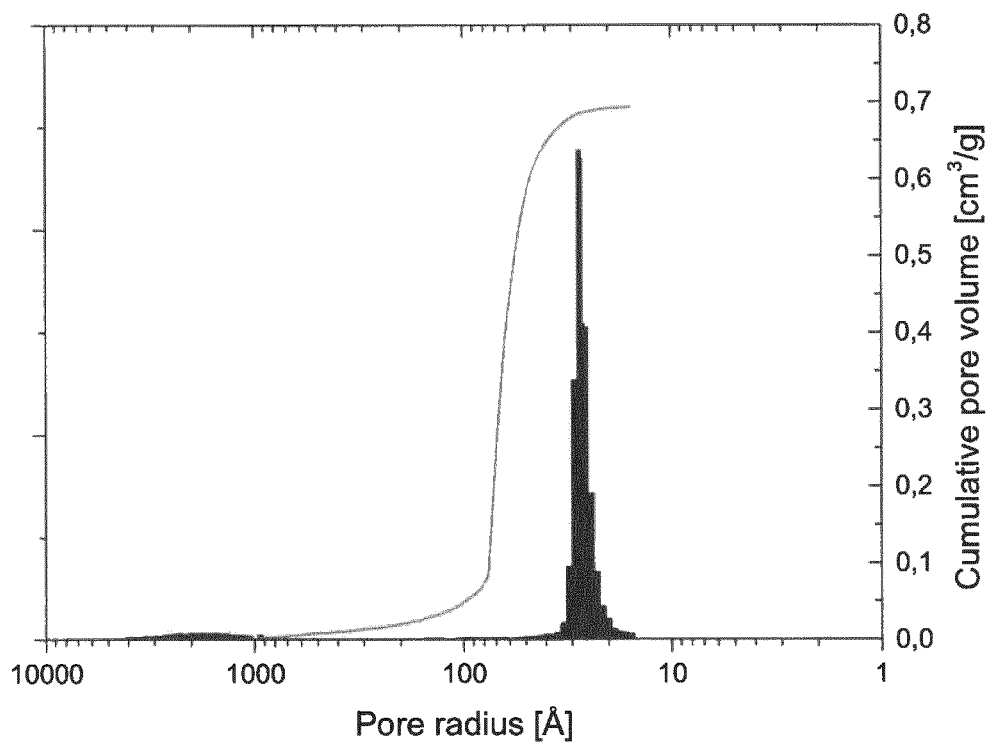

The invention will now be described by way of non-limiting examples and Figures where:

FIGS. 1.1 and 1.2 are scanning microscopic images of the granulated particles of Example 1;

FIG. 1.3 is a scanning microscopic image of sliced granulated particles of Example 1;

FIG. 2 represents a monomodal pore size distribution of granulated particles of Example 1;

FIGS. 3.1 and 3.2 are scanning microscopic images of the granulated particles of Example 2;

FIG. 3.3 is a scanning microscopic image of sliced granulated particles of Example 2;

FIG. 4 represents a monomodal pore distribution of granulated particles of Example 2;

FIGS. 5.1 and 5.2 are scanning microscopic images of the granulated particles of Comparative Example 1;

FIG. 5.3 is a scanning microscopic image of sliced granulated particles of Comparative Example 1;

FIG. 6 represents a monomodal pore distribution of the granulated particles of Comparative Example 1;

FIGS. 7.1 and 7.2 are a scanning microscopic images of the granulated particles of Comparative Example 2;

FIG. 7.3 is a scanning microscopic image of a sliced granulated particles of Comparative Example 2 and FIG. 8 represents a monomodal pore distribution of the granulated particles of Comparative Example 2.

EXAMPLE 1

For preparation of non-calcined granulated alumina particles, a dispersion medium including the alumina was prepared as follows:

12 kg Pural SB (boehmite) with a crystallite size of 5 nm (120 reflection) was added to 80 kg of water to form a dispersion medium. The dispersion medium was transferred into a vessel including a stirrer and successively wet-milled using an agitator ball mill (Drais Werke GmbH Mannheim Germany, PMC5 TEX) equipped with 1.0-1.2 mm α- (alpha) alumina grinding balls.

After milling, a 10 wt.-% solution of an organic binder of polyvinyl alcohol (KURARAY Poval 4-88 -Poval 4-88 has a viscosity measured for a 4wt-% solution in water at 20° C. according to DIN 53015 of approximately 4 mPa*s and a grade of hydrolysis of 88mol% (meaning that 88% of the vinyl acetate functional groups are saponified) was added to the dispersion medium such that the amount of polyvinyl alcohol was 5 wt.-% relative to the used boehmite. The resulting dispersion medium had an inorganic particle solid content of 12%, a pH value of 7.8 and a $D_{90}$ of 9.4 μm.

For granulation, seed material in the form of 3.6 kg of Pural SB (boehmite) with a $D_{50}$ value of 50 μm was placed in the Vario 7 process chamber of a ProCell Labsystem fluidized bed granulator from Glatt.

The granulation was conducted using bottom spray configuration with a two-component jet with an orifice of 1.8 mm. The Pural SB seed material was fluidized applying a heated air flow with a superficial velocity of 0.8 m/s, a fluidization number of 5 and an inlet temperature of 110-120° C.

The dispersion medium was sprayed with a flow rate of 4-5 kg/h into the fluidized bed using a spraying pressure of 1.1-1.3 bar (gauche pressure). The evaporation rate related to the bed mass was 1.2-2.1 kg/(kg*h) and 60-96 kg/(m²*h) related to the area of the distribution plate.

During the whole granulation process the temperature inside the process chamber was held between 50° C. and 60° C. while the relative humidity inside the process chamber was adjusted ranging from 35% to 45%. The material inside the process chamber was held in the fluidized state and the air flow rate and inlet temperature was adjusted to keep the temperature and humidity inside the process chamber in the desired range.

The particle growth was conducted until the targeted particle size ($D_{50}$) of 450 μm was reached. During the growth phase, material was discharged periodically out of the process chamber every hour to keep the bed mass on a constant level. After the targeted particle size was reached the material was discharged over a zig-zag sifter applying a sifter counter pressure of 1.4 bar (gauche pressure).

Finally, the boehmite granulated particles were calcined under air atmosphere at 550° C. for 3h in a muffle oven.

Scanning microscopic images of the granulated particles are shown in FIGS. 1.1 to 1.3. FIGS. 1.1 to 1.3 show the granulated particles with a high sphericity and a smooth outer surface. FIG. 2 shows the monomodal size distribution of the granulated particles of Example 1.

Properties of the calcined boehmite granulated particles are included in Table 1.

TABLE 1

| Sphericity/— | 0.974 |
|---|---|
| Amount of attrition/% | 1.2 |
| $D_{10}$/μm | 350 |
| $D_{50}$/μm | 449 |
| $D_{90}$/μm | 553 |
| Specific surface area/m$^2$/g | 191 |
| Pore volume/cm$^3$/g | 0.46 |
| Loose bulk density/g/cm$^3$ | 0.78 |
| Pore radius maximum/Å | 35 |

EXAMPLE 2

For preparation of attrition stable granulated alumina particles the granulation dispersion was prepared as follows:

Suspending 12 kg Pural TM50 (boehmite) with a crystallite size of 7.2 nm (120 reflection) in 100 kg water with a stirrer and successively wet-milling the dispersion using an agitator ball mill (Drais Werke GmbH Mannheim Germany, PMC5 TEX) equipped with 1.0-1.2 mm α- (alpha) alumina grinding balls. After milling, a 10 wt.-% solution of polyvinyl alcohol (KURARAY Poval 4-88) was added to the dispersion so that the amount of an organic binder of polyvinyl alcohol was 5 wt-% related to the used boehmite. Furthermore, formic acid was added to adjust the pH of the dispersion to a value of 6. The resulting granulation dispersion had after dilution with water an inorganic particle solid content of 10% and a $D_{90}$ of 12.0 μm.

For granulation, 3.6 kg of Pural TM50 (boehmite) seed material with a median particle size ($D_{50}$) of 75 μm was placed in the Vario 7 process chamber of a ProCell Labsystem fluidized bed granulator from Glatt.

The granulation was conducted using bottom spray configuration with a two-component jet with an orifice of 1.8 mm. The Pural TM50 was fluidized applying a heated air flow with a superficial velocity of 0.8 m/s, a fluidization number of 5 and an inlet temperature of 110-120° C.

The dispersion medium was sprayed with a flow rate of 4-5 kg/h into the fluidized bed using a spraying pressure of 1.1-1.3 bar (gauche pressure). The evaporation rate related to the bed mass was 1.2-2.1 kg/(kg*h) and 60-96 kg/(m$^2$*h) related to the area of the distribution plate. During the whole granulation process the temperature inside the process chamber was held between 50° C. and 60° C. while the relative humidity inside the process chamber was adjusted ranging from 35% to 45%. The material inside the process chamber was held in the fluidized state and the air flow rate and inlet temperature was adjusted to kept the temperature and humidity inside the process chamber in the desired range.

The particle growth was conducted until the targeted particle size ($D_{50}$) of 500 μm was reached. During the growth phase material was discharged periodically out of the process chamber every hour to keep the bed mass on a constant level. After the targeted particle size was reached the material was discharged over a zig-zag sifter applying a sifter counter pressure of 1.2 bar (gauche pressure).

Finally, the boehmite granules were calcined under air atmosphere at 650° C. for 3 h in a muffle oven.

Scanning microscopic images of the granulated particles are shown in FIG. 3. FIG. 3 shows that the particles have a high sphericity and a smooth outer surface. FIG. 4 shows the monomodal pore size distribution of the granulated particles of Example 2.

Properties of the calcined boehmite granulated particles are included in Table 2:

TABLE 2

| Sphericity/— | 0.973 |
|---|---|
| Amount of attrition/% | 1.5 |
| $D_{10}$/μm | 387 |
| $D_{50}$/μm | 499 |
| $D_{90}$/μm | 600 |
| Specific surface area/m$^2$/g | 188 |
| Pore volume/cm$^3$/g | 0.73 |
| Loose bulk density/g/cm$^3$ | 0.61 |
| Pore radius maximum/Å | 72 Å |

COMPARATIVE EXAMPLE 1

For comparison, the granulation was conducted using a dispersion medium based on EP 0790859 B1, i.e. without selecting the size of the inorganic particles in the dispersion medium or adjusting the size of the inorganic particles in the dispersion medium though a wet-milling step. A 10 wt.-% solution of polyvinyl alcohol (KURARAY Poval 4-88) was added to the dispersion medium so that the amount of polyvinyl alcohol was 5 wt-% related to the used boehmite.

The dispersion medium had an inorganic particle solid content of 11%, a pH value of 8.1 and a $D_{90}$ of 95 μm.

All other granulation parameters were analog the procedure described in Example 1.

FIG. 5 shows the particles with a rougher outer surface and a significantly higher amount of attrition than shown for the Examples of the invention.

Properties of the calcined boehmite granulated particles of Comparative Example 1 are included in Table 3:

TABLE 3

| Sphericity/— | 0.941 |
|---|---|
| Amount of attrition/% | 6.4 |
| $D_{10}$/μm | 262 |
| $D_{50}$/μm | 356 |
| $D_{90}$/μm | 465 |
| Specific surface area/m$^2$/g | 220 |
| Pore volume/cm$^3$/g | 0.44 |
| Loose bulk density/g/cm3 | 0.81 |
| Pore radius maximum/Å | 27 |

COMPARATIVE EXAMPLE 2

For comparison, the granulation was conducted using a dispersion medium based on dispersing Pural SB in water acidified with nitric acid without further adjusting the particle size in dispersion through a wet-milling step. A 10 wt.-% solution of polyvinyl alcohol (KU Y Poval 4-88) was added to the dispersion so that the amount of polyvinyl alcohol was 3 wt-% related to the used boehmite. The dispersion medium had an inorganic particle solid content of 23%, a pH value of 3.8 and a $D_{90}$ of 22 µm.

All other granulation parameters were analog the procedure described in Example 1.

TABLE 4

| | |
|---|---|
| Sphericity/— | 0.975 |
| Amount of attrition/% | 10.2 |
| $D_{10}$/µm | 233 |
| $D_{50}$/µm | 309 |
| $D_{90}$/µm | 388 |
| Specific surface area/m²/g | 233 |
| Pore volume/cm³/g | 0.38 |
| Loose bulk density/g/cm³ | 0.87 |
| Pore radius maximum/Å | 28 |

The invention claimed is:

1. A method of producing granulated particles in a fluidized-bed granulation reactor, the method comprising feeding inorganic particles dispersed in a dispersion medium into the fluidized-bed granulation reactor, the inorganic particles in the dispersion medium having a $D_{90}$ value of between 1 µm and 15 µm, wherein the dispersion medium includes between 5 and 60 wt. % inorganic particles relative to the total amount of the dispersion medium.

2. The method of claim 1 wherein the dispersion medium comprising inorganic particles dispersed therein is sprayed into a process chamber of the fluidized-bed granulation reactor while heated process gas flows through the process chamber from the bottom to the top.

3. The method of claim 2, wherein the heated gas has an inlet temperature when entering the process chamber of 50° C. to 550° C.

4. The method of claim 3, wherein the heated gas has an inlet temperature when entering the process chamber of 100° C. to 400° C.

5. The method of claim 1, wherein the $D_{90}$ value of the inorganic particles in the dispersion medium fed into the fluidized-bed granulation reactor is between 1 µm and 10 µm.

6. The method of claim 1, wherein the inorganic particles include compounds of alkaline earth metals, rare earth elements, platinum group elements, iron group elements, Cu, Ag, Au, Zn, Al, In, Sn, Si, P, V, Nb, Mo, W, Mn, Re, Ti, Zr or mixtures thereof.

7. The method of claim 1, wherein the inorganic particles are particles of alumina, silica, or a mixture thereof.

8. The method of claim 1, wherein the dispersion medium comprises water or consists of water.

9. The method of claim 1, wherein a stabilizer is added to the dispersion medium.

10. The method of claim 1, including the initial step of milling the inorganic particles in the dispersion medium to a $D_{90}$ value between 1 µm and 15 µm before entering into the fluidized-bed granulation reactor.

11. The method of claim 10, wherein a stabilizer is added to the dispersion medium only after the milling step.

12. The method of claim 1, wherein the dispersion medium has a pH of between 2 and 12.

13. The method of claim 1, including a calcination step, wherein the calcination is conducted at a temperature of between 350° C. and 1600° C. for a period of 30 minutes to 5 hours.

14. The method of claim 1, wherein seed material comprising primary particles having a $D_{50}$ value from 5 µm to 200 µm is either further included in the dispersion fed into the fluidized-bed granulation reactor and/or is already present in the fluidized-bed granulation reactor when the dispersion is fed into the fluidized-bed granulation reactor.

15. Spherical calcinated granulated particles produced according to the method of claim 1 having a $D_{50}$ value of between 100 and 5000 µm.

16. Spherical, calcined granulated particles having
a $D_{50}$ value of the granulated particles between 150 and 5000 µm, a volume based sphericity of the particles of the granulated material between 0.900 and 1.00 and attrition value of less than 5%, further characterized by the following characteristics:
a specific surface area ranging from 150 to 300 m²/g; and
a monomodal or multimodal pore size distribution with pore radii maxima between 25 and 100000 Å.

17. The spherical calcined granulated particles of claim 16, further characterized by at least one of the following characteristics:
a loose bulk density between 0.3 and 2.5 g/cm³;
a pore volume of 0.01 to 2.0 cm³/g.

18. The spherical calcined granulated particles of claim 16 wherein the monomodal or multimodal pore size distribution with pore radii maxima is between 25 and 500 Å.

* * * * *